Patented June 19, 1928.

1,673,797

UNITED STATES PATENT OFFICE.

SANDFORD BROWN, OF MONTCLAIR, NEW JERSEY, ASSIGNOR TO BAKELITE CORPORATION, OF NEW YORK, N. Y., A CORPORATION OF DELAWARE.

PROCESS OF MAKING IMPREGNATED FABRICS.

No Drawing. Application filed August 11, 1925, Serial No. 49,644. Renewed November 10, 1927.

In a co-pending application, Serial Number 29,035, filed May 9th, 1925, I have disclosed and claimed a process of producing impregnated fabrics, according to which yarns or threads, before being woven into fabric, are impregnated with a reactive phenol resin. According to the said application, the yarn, or preferably the thread spun from the yarn, is thoroughly impregnated with the reactive resin, preferably by being drawn continuously through an alcoholic or acetone solution of the same. It then passes through a drying oven wherein the solvent is evaporated, without however being subjected to sufficient heat to cause the resin to acquire its final insoluble and infusible state. Thereafter the yarn or thread, hereinafter for convenience referred to simply as the impregnated thread, is woven into the desired form, and is ready for the molding and heating operations by which it is converted into the final shape, as a sheet, board or blank from which finished articles such as gears, gaskets, packings, etc. may be made. In the co-pending application referred to the process is more specifically described as applied to the production of brake linings for automobiles, etc., the thread in such case being preferably a combination thread spun from asbestos and cotton fibers, or from such fibers in combination with wire of brass or other suitable metal.

My present invention is a modification of and improvement upon the foregoing, and consists essentially in contacting the fibers, either in the state of yarn or of a simple or composite thread, with a phenol resin in a state of colloidal suspension, as prepared for example by passing the resin, preferably in fluid condition and admixed with water, through a colloid mill, which may for instance be a Premier mill. Thereby I produce a stable, milky, aqueous suspension of the resin, which may contain up to 40% or even more of resin by weight. The process is of course applicable irrespective of whether or not the resin is of the reactive type,—that is to say susceptible of being transformed by application of sufficient heat into an infusible resinoid body, as is now well understood in this art. In the preferred embodiment of the invention however a reactive resin is used. This reactive resin may be a direct partial reaction product of phenol and formaldehyde or their equivalents, or it may be a resin of the fusible and soluble (non-reactive) type with which is associated sufficient formaldehyde, hexamethylenetetramine or other hardening agent to impart the reactive character and bring about the resinoid transformation. It has been found that proportions of hexamethylenetetramine sufficient to transform the colloidal resin may be introduced into the suspension without adversely affecting its stability, and I usually prefer a suspension consisting essentially of the fusible resin and the methylene-containing hardening agent proportioned to yield, after drying and upon heating, the desired infusible resinoid.

The minute resin particles, together with the hardening agent, if the latter is in solution in the aqueous liquid, are taken up by the yarn or thread, in much the same manner as if alcoholic or other true solutions were used. The water is then driven off by passing the impregnated thread continuously through a drying oven, as already described, and the thread is ready for the weaving operation.

It will be understood that dyes, lubricants, and in general all such substances as are not injurious to the colloidal suspension or emulsion or inconsistent with its stability may be added to it. For example, I may add to the colloid suspension aluminum powder, which is held in suspension by agitation if necessary, and is taken up by the yarn or thread. This is particularly desirable when the impregnated thread is intended for brake linings, clutch facings, or similar applications requiring good heat-conductivity.

The impregnation of yarns or spun threads with the reactive phenol resin, and their subsequent weaving into forms suitable for hot-pressing or so-called cold molding operations presents many advantages as compared with the present practice of impregnating the woven fabric. Not only is the impregnation more perfect and uniform, due to its being applied to the component elements of the fabric instead of to the fabric itself, as well as much cheaper owing to the absence of elaborate equipment, but it presents the great advantage that the yarn or thread may be directly woven into the form of blanks ready for molding into the desired final shapes, as brake shoe linings, gaskets, gears, etc., whereby the waste incurred in the cutting of sheets is avoided or minimized.

Among the general advantages possessed by these colloidal suspensions, as compared with the alcoholic or other solutions heretofore used, I may mention the following:

1. Elimination of fire hazard.
2. The saving of the cost of expensive organic solvents, and of the equipment for recovering them.
3. Upon evaporation the resin is deposited in the form of minute discrete particles, rather than as a continuous film; this permits a readier escape of the vapors, or in other words a quicker and more complete drying out of the product.
4. In the case of coated sheets there is little or no tendency to the formation of surface blisters, since there are no continuous films.
5. Experience has shown that water is not retained by the resin with the same tenacity as are organic solvents; it is hence more easily and completely eliminated, either before or after molding.
6. Small percentages of water do not paralyze or retard the transformation of the reactive resin, as do alcohol and the organic solvents.
7. The aqueous colloidal suspension is non-viscous, and is therefore not subject to alterations in viscosity due to evaporation, as is the case with alcoholic and other solutions, which is of great advantage in coating, impregnating and similar operations.
8. Colloidal suspensions have been found to afford a more constant fiber-resin ratio throughout the finished article or sheet than is attainable with true solutions. Such solutions tend to deposit resin at and near the surface from which the solvent evaporates, resulting in a local concentration of resin at such surfaces. Colloidal suspensions do not exhibit this tendency.

The consequence of the foregoing several advantages is a marked and material technical advance due to the use of colloidal suspensions, as compared with the solutions or varnishes as heretofore employed.

I claim:

1. In a process of making molded articles comprising a spun fiber and a phenol resin binder, the steps of impregnating the fibrous thread by means of a phenol resin in colloidal suspension, and drying.

2. In a process of making impregnated fabrics, the steps of impregnating a fibrous thread by means of a phenol resin in colloidal suspension, drying the thread, and weaving into fabric.

3. Process of making molded articles comprising a fabric and a phenol resin binder, consisting in impregnating a fibrous thread by means of a phenol resin in colloidal suspension, drying and weaving, and molding the resulting fabric.

In testimony whereof, I affix my signature.

SANDFORD BROWN